(12) United States Patent
Dhara et al.

(10) Patent No.: US 8,600,964 B2
(45) Date of Patent: Dec. 3, 2013

(54) METHODS AND APPARATUS FOR PROVIDING CUSTOMER TREATMENT INFORMATION OVER A NETWORK

(75) Inventors: Krishna K Dhara, Dayton, NJ (US); Venkat R Goud, Laurence Harbor, NJ (US); Venkatesh Krishnaswamy, Holmdel, NJ (US)

(73) Assignee: Avaya Inc., Basking Ridge, NJ (US)

( * ) Notice: Subject to any disclaimer, the term of this patent is extended or adjusted under 35 U.S.C. 154(b) by 875 days.

(21) Appl. No.: 11/863,879

(22) Filed: Sep. 28, 2007

(65) Prior Publication Data

US 2009/0089289 A1 Apr. 2, 2009

(51) Int. Cl.
*G06F 17/30* (2006.01)
(52) U.S. Cl.
USPC .......................................... 707/705; 707/781
(58) Field of Classification Search
USPC .................................................. 707/705, 781
See application file for complete search history.

(56) References Cited

U.S. PATENT DOCUMENTS

| | | | | |
|---|---|---|---|---|
| 7,865,521 | B2 * | 1/2011 | Bird et al. ...................... | 707/781 |
| 8,458,230 | B2 * | 6/2013 | Korablev et al. ............... | 707/809 |
| 2001/0032148 | A1 * | 10/2001 | Yamazoe et al. ................ | 705/26 |
| 2001/0037415 | A1 * | 11/2001 | Freishtat et al. .............. | 709/328 |
| 2004/0249749 | A1 * | 12/2004 | Strayer et al. .................... | 705/39 |
| 2006/0075467 | A1 * | 4/2006 | Sanda et al. ....................... | 726/1 |
| 2007/0208574 | A1 * | 9/2007 | Zheng et al. ....................... | 705/1 |
| 2008/0016214 | A1 * | 1/2008 | Galluzzo et al. ............... | 709/226 |
| 2008/0222001 | A1 * | 9/2008 | Kunieda et al. ................. | 705/20 |
| 2008/0301794 | A1 * | 12/2008 | Lee ................................. | 726/11 |

FOREIGN PATENT DOCUMENTS

| | | |
|---|---|---|
| JP | 2002149873 | 5/2002 |
| KR | 20010033456 | 4/2001 |
| KR | 20020093188 A | 12/2002 |

OTHER PUBLICATIONS

"Statement in accordance with the Notice from the European Patent Office dated Oct. 1, 2007 concerning business methods", "XP002456252".
Lopes Margarido, C., "EP Application No. 08163845.4-2221 Extended European Search Report Nov. 18, 2008", , Publisher: EPO, Published in: EP.
Lopes, Margarido C., "EP Application No. 08163845.4 Office Action Apr. 29, 2010", , Publisher: EPO, Published in: EP.
Son, Young-Tae, "KR Application No. 10-2008-0093676 Office Action Aug. 30, 2010", , Publisher: KIPO, Published in: KR.
Son, Young-Tae, "KR Application No. 10-2008-0093676 Office Action Feb. 18, 2011", , Publisher: KIPO, Published in: KR.

(Continued)

*Primary Examiner* — Robert Beausoliel, Jr.
*Assistant Examiner* — Noosha Arjomandi

(57) ABSTRACT

Methods and apparatus are disclosed for providing customer treatment information over a network. A transaction communication is established between a first enterprise and a second enterprise by receiving a request from a user associated with the first enterprise to establish the transaction communication; determining if the second enterprise is authorized to access enterprise information of the first enterprise; obtaining enterprise information from an enterprise database of the first enterprise; and providing the obtained information to the second enterprise as part of the establishment of the transaction communication if the second enterprise is authorized to access the enterprise information of the first enterprise. The enterprise information is typically related to the transaction and may comprise one or more of customer priority information and a transaction history. The second enterprise can determine if a third enterprise is authorized to access enterprise information of the first enterprise and/or the second enterprise.

14 Claims, 4 Drawing Sheets

(56) References Cited

OTHER PUBLICATIONS

Bauer, Rodophe, "EP Application No. 08163845.4 Decision to Refuse Dec. 23, 2010", , Publisher: EPO, Published in: EP.

Lopes, Margarido C., "EP Application No. 08163845.4-2221 / 2043035 Office Action Oct. 20, 2009", , Publisher: EPO, Published in: EP.

* cited by examiner

FIG. 2

ENTERPRISE-LEVEL DATABASE
(BUSINESS A)

130-A

| ROLE | BUSINESS B | ... | BUSINESS C |
|---|---|---|---|
| TECHNICAL EMPLOYEE | PRIORITY CUSTOMER | | TRANSACTION HISTORY |
| ... | | | |
| IT ADMINISTRATOR | HIGH PRIORITY CUSTOMER | | TRANSACTION HISTORY |

METHODS AND APPARATUS FOR PROVIDING CUSTOMER TREATMENT INFORMATION OVER A NETWORK

FIELD OF THE INVENTION

The present invention relates generally to call centers and other types of communication processing systems, and more particularly to methods and systems for processing customer treatment information

BACKGROUND OF THE INVENTION

Call centers and other customer service centers typically distribute telephone calls and other types of communications to available service agents in accordance with various predetermined criteria, such as an arrival order, the nature of the call, a predefined quality of service status or another customer rating. It is becoming increasingly important that call centers be able to provide an appropriate level of customer contact treatment based upon the relationship and value a particular customer has to the business. Many customers choose alternate forms of contact into a business, particularly web-based contact over the Internet or another Internet Protocol (IP) network Businesses are looking to support their customer segmentation strategies regardless of the form of contact a customer may choose to obtain service. Thus, companies should be able to provide the best agent resource for a given customer regardless of how the customer chooses to access the call center.

In order to determine an appropriate customer treatment for received communications, a call center typically identifies the caller and then and accesses information about the identified caller, for example, from a call center database. For example, a first business might have a priority relationship with a second business, whereby customers within the first business are accorded preferential treatment by the second business. The second business must automatically identify calls associated with the first business to determine an appropriate priority customer treatment.

In addition, for many business-to-business communications, customer information must often be passed to additional entities, such as supply chain partners, trading partners or subcontractors that handle customer service or technical support on behalf of another entity. Many businesses, however, are often reluctant to have their proprietary data transmitted over a network, especially when the ultimate recipient does not have an established relationship with the original customers.

A need therefore exists for improved methods and apparatus for providing customer information over a network to a call center or another entity.

SUMMARY OF THE INVENTION

Generally, methods and apparatus are disclosed for providing customer treatment information over a network. According to one aspect of the invention, a transaction communication is established between a first enterprise and a second enterprise by receiving a request from a user associated with the first enterprise to establish the transaction communication; determining if the second enterprise is authorized to access enterprise information of the first enterprise; obtaining enterprise information from an enterprise database of the first enterprise; and providing the obtained information to the second enterprise as part of the establishment of the transaction communication if the second enterprise is authorized to access the enterprise information of the first enterprise. The enterprise information is typically related to the transaction and may comprise one or more of customer priority information and a transaction history. The enterprise information can be based, for example, on an identity of the user or an identity of the second enterprise.

According to another aspect of the invention, after the second enterprise receives the obtained information from the first enterprise, the second enterprise can determine if a third enterprise is authorized to access enterprise information of the first enterprise. The second enterprise can optionally forward the transaction communication to a third enterprise with the obtained information as part of the establishment of the transaction communication with the third enterprise if the third enterprise is authorized to access the enterprise information of the first enterprise. The second enterprise can optionally forward the transaction communication to a third enterprise with information about the second enterprise as part of the establishment of the transaction communication with the third enterprise if the third enterprise is authorized to access the enterprise information of the second enterprise.

A more complete understanding of the present invention, as well as further features and advantages of the present invention, will be obtained by reference to the following detailed description and drawings

BRIEF DESCRIPTION OF THE DRAWINGS

FIG. 2 is a sample table for an exemplary enterprise-level database for enterprise A of FIG. 1;

DETAILED DESCRIPTION

The present invention provides improved methods and apparatus for providing customer information to a call center or another entity. For example, the disclosed system allows tagging of calls based on vendor relationships or business partner relationships. In one exemplary implementation, an outgoing call is tagged at its origination with customer priority information. The tags allow the recipient to process the call according to the appropriate customer treatment.

Figure 1:
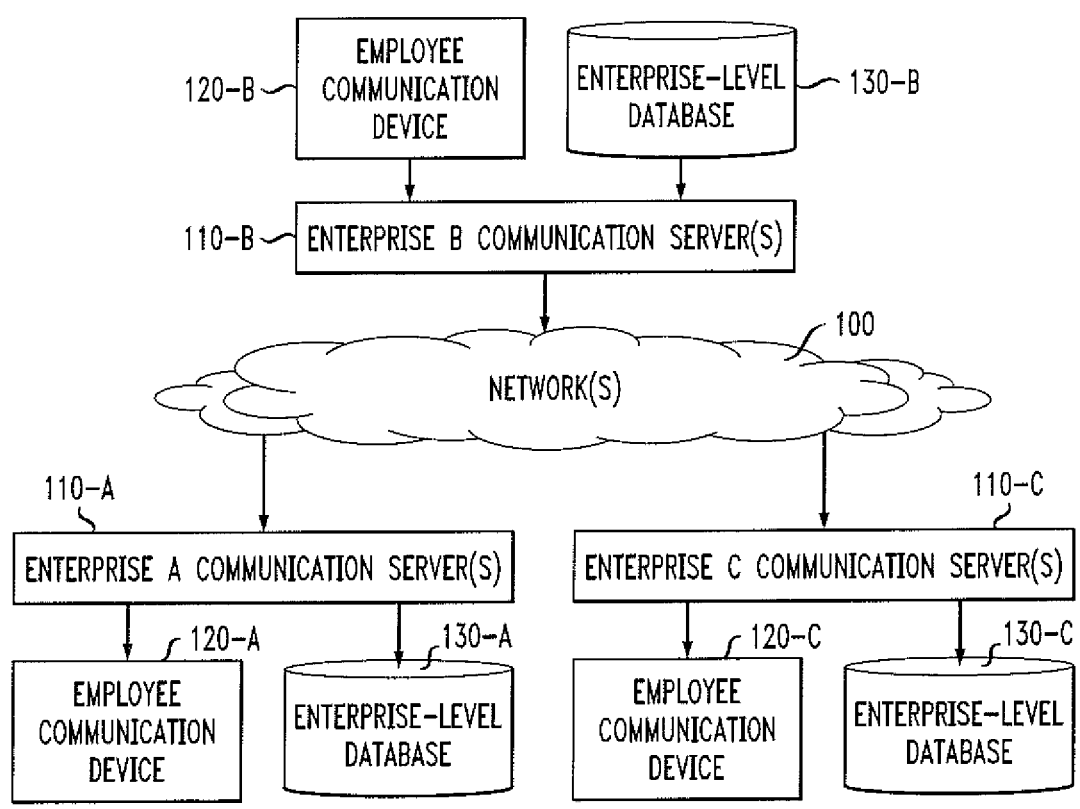
FIG. 1 illustrates an exemplary network environment 100 in which the present invention can operate.

FIG. 1 illustrates an exemplary network environment 100 in which the present invention can operate. It is noted that the network environment 100 may comprise any combination of public or private, wired or wireless network. As shown in FIG. 1, a first business, referred to as enterprise A, provides one or more enterprise A communication server(s) 110-A, for connecting one or more internal users, such as employees, that each employ an employee communication device 120-A, to the network 100. In addition, enterprise A manages an enterprise-level database 130-A, discussed further below in conjunction with FIG. 2, that contains enterprise information, in a known manner. Similarly, a second business, referred to as enterprise B, provides one or more enterprise B communication server(s) 110-B, employee communication devices 120-B and an enterprise-level database 130-B A third business, referred to as enterprise C, provides one or more enterprise C communication server(s) 110-C, employee communication devices 120-C and an enterprise-level database 130-C.

Assume that calls from employees of enterprise A should receive preferential treatment from enterprise B and its partners, such as enterprise C. However, the data fox the employees of enterprise A is typically embedded and protected in the enterprise-level database 130-A, which is generally inaccessible to the partners of enterprise A. According to one aspect of the present invention, the communication server(s) 110-A of enterprise A automatically attaches a priority code or additional customer information to an outgoing communication for further processing by enterprise B and/or C. The enterprise B communication server(s) 110-B will receive the call, process the attached customer information and handle the call in an appropriate manner. If enterprise B needs to forward the call to another entity, such as enterprise C, enterprise B will append additional information or pass along the original customer information to enterprise C as part of the communication. In this manner, enterprise C can handle the call with an appropriate customer treatment FIG. 2 is a sample table for an exemplary enterprise-level database 130-A flux enterprise A of FIG. 1. As shown in FIG. 2, the enterprise-level database 130-A comprises a record for each type of role within enterprise A. For each role, the enterprise-level database 130-A indicates the corresponding customer information that should be sent to each business partner of enterprise A. For example, a Technical Employee of enterprise A might have a priority status with enterprise B, while an IT Administrator of enterprise A might have a high priority status with enterprise B. Likewise, when dealing with enterprise C, the appropriate customer information for the employees of enterprise A that are Technical Employee or IT Administrators might comprise the individual's transaction history with enterprise C.

Figure 3:
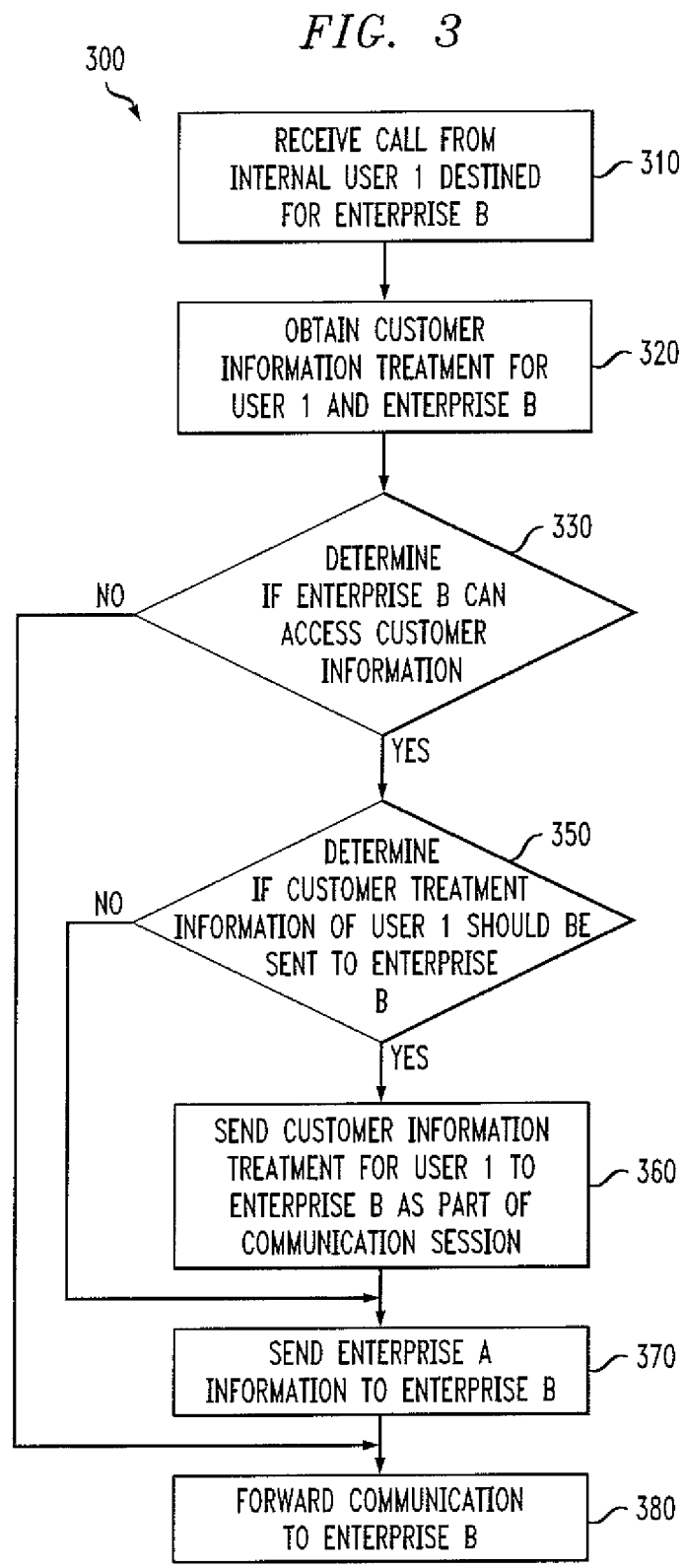
FIG. 3 is a flow chart describing an exemplary implementation of an outgoing server process incorporating features of the present invention.

FIG. 3 is a flow chart describing an exemplary implementation of an outgoing server process 300 incorporating features of the present invention. Generally, the outgoing server process 300 is executed by a server associated with the originating enterprise associated with a call. As shown in FIG. 3, the outgoing server process 300 initially receives a call during step 310 from an internal user, such as user 1, that is destined for enterprise B. Thereafter, the outgoing server process 300 accesses the enterprise-level database 130-A (FIG. 2) during step 320 to obtain the appropriate customer information treatment for user 1 and enterprise B. For example, if user 1 is a technical employee and the destination is enterprise B, then a priority status will be attached to the call.

A test is performed during step 330 to determine if enterprise B is authorized to access the customer information of user 1 and enterprise A. If it is determined during step 330 that enterprise B can access the customer information, then a further test is performed during step 350 to determine if the obtained customer treatment information for user 1 should be sent to enterprise B. If it is determined during step 350 that the obtained customer treatment information for user 1 should be sent to enterprise B, then the customer information treatment for user 1 is sent to enterprise B as part of the communication session during step 360. Program control then proceeds to step 370.

If, however, it is determined during step 350 that the obtained customer treatment information for user 1 should not be sent to enterprise B (or following execution of step 360), then the information for enterprise A is sent to enterprise B during step 370.

If it was determined during step 330 that enterprise B cannot access the customer information (or following execution of step 370), then the communication is forwarded to enterprise B during step 380, for example, with an automatic number identification (ANI) or with user-to-user information (UUI).

Figure 4:
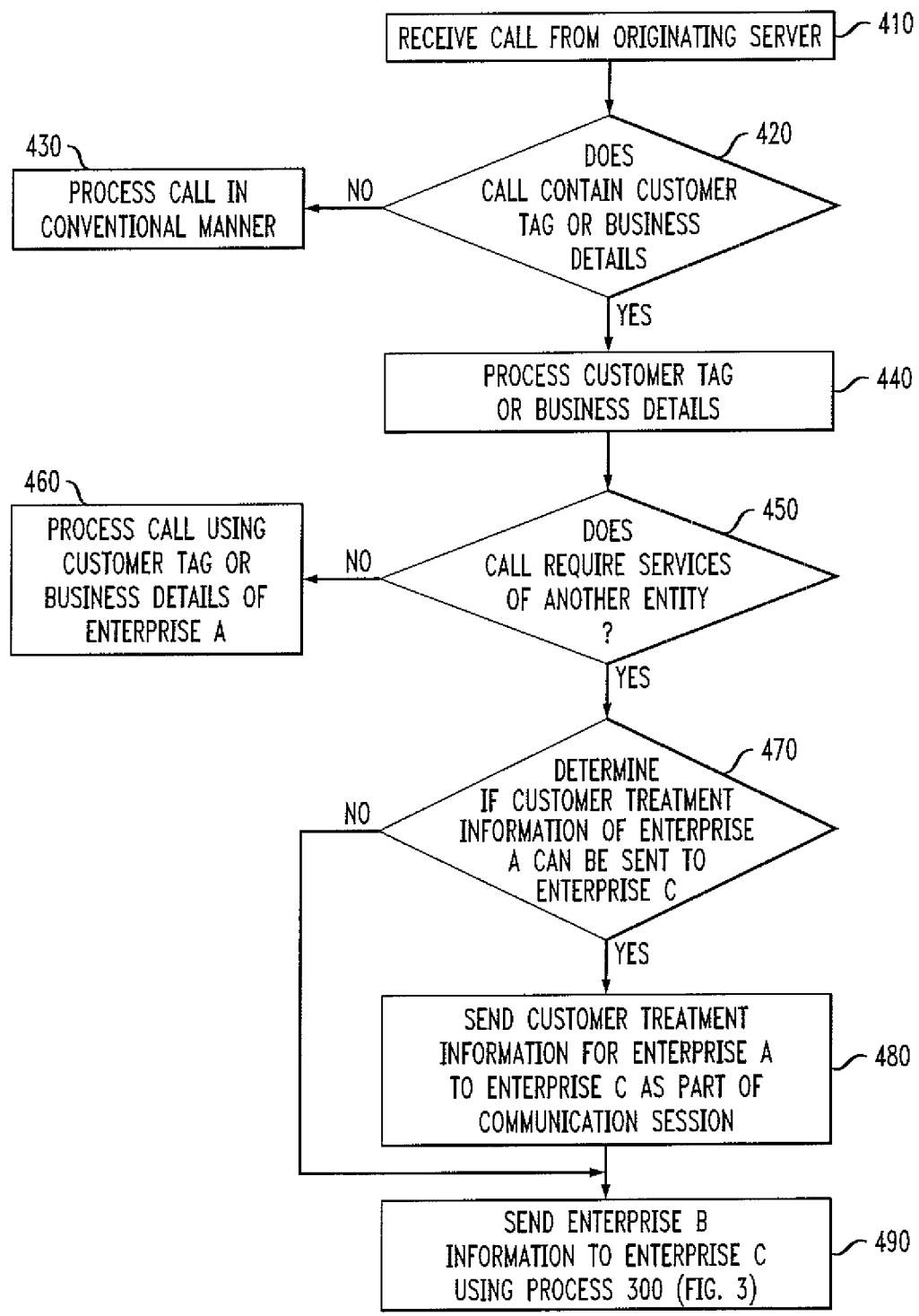
FIG. 4 is a flow chart describing an exemplary implementation of an intermediate server process incorporating features of the present invention.

FIG. 4 is a flow chart describing an exemplary implementation of an intermediate server process 400 incorporating features of the present invention. Generally, the intermediate server process 400 is executed by a server associated with an intermediate enterprise associated with a call, such as enterprise B and/or C in the example of FIG. 1. As shown in FIG. 4, the intermediate server process 400 initially receives a call from the originating server, such as enterprise A communication server(s) 110-A, during step 410. Thereafter, a test is performed during step 420 to determine if the call contains a customer tag or business details of enterprise A.

If it is determined during step 420 that call does not contain a customer tag or business details of enterprise A, then the call is processed in conventional manner during step 430. If, however, it is determined during step 420 that call contains a customer tag or business details of enterprise A, then the received customer tag or business details of enterprise A are processed during step 440.

Thereafter, a further test is performed during step 450 to determine if the call requires the services of another entity. If it is determined during step 450 that the call does not require the services of another entity, then the call is processed during step 460 using the received customer tag or business details of enterprise A.

If, however, it is determined during step 450 that the call requires the services of another entity, then a further test is performed during step 470 determine if the customer treatment information of enterprise A can be sent to enterprise C. If it is determined during step 470 that the customer treatment information of enterprise A can be sent to enterprise C, then the customer treatment information for enterprise A is sent to enterprise C as part of the communication session during step 480. If however, it is determined during step 470 that the customer treatment information of enterprise A cannot be sent to enterprise C (or following execution of step 480), then the customer information of enterprise B is sent to enterprise C using process 300 (FIG. 3) during step 490.

While the figures herein show an exemplary sequence of steps, it is also an embodiment of the present invention that the sequence may be varied Various permutations of the algorithm are contemplated as alternate embodiments of the invention In addition, while exemplary embodiments of the present invention have been described with respect to processing steps in a software program, as would be apparent to one skilled in the art, various functions may be implemented in the digital domain as processing steps in a software program, in hardware by circuit elements or state machines, or in combination of both software and hardware Such software may be employed in, for example, a digital signal processor, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the worldwide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

What is claimed is:

1. A method comprising:
   receiving, by a communication server, a request from a user to establish a communication between a first enterprise and a second enterprise;
   determining whether the second enterprise is authorized to access enterprise priority information of the first enterprise, wherein the enterprise priority information is based on an identity of the user;
   when the second enterprise is authorized to access the enterprise priority information of the first enterprise, sending the enterprise priority information of the first enterprise to the second enterprise as part of establishing the communication between the first enterprise and the second enterprise;
   when a third enterprise is authorized to access the enterprise priority information of the first enterprise, sending the enterprise priority information of the first enterprise to the third enterprise as part of establishing a transaction communication with the third enterprise; and
   forwarding the communication to the third enterprise when the third enterprise is authorized to access enterprise priority information of the second enterprise.

2. The method of claim 1, wherein the enterprise priority information is related to the communication.

3. The method of claim 1, wherein the enterprise priority information comprises at least one of customer priority information and a transaction history.

4. The method of claim 1, wherein the enterprise priority information is based on an identity of the second enterprise.

5. The method of claim 1, wherein the communication server is associated with the first enterprise.

6. The method of claim 1, further comprising determining whether the third enterprise is authorized to access the enterprise priority information of the first enterprise.

7. A system comprising:
   a processor; and
   a computer-readable medium having stored therein instructions which, when executed by the processor, cause the processor to perform operations comprising:
     receiving a request from a user to establish a communication between a first enterprise and a second enterprise;
     determining whether the second enterprise is authorized to access enterprise priority information of the first enterprise, wherein the enterprise priority information is based on an identity of the user;
     when the second enterprise is authorized to access the enterprise priority information of the first enterprise, sending the enterprise priority information of the first enterprise to the second enterprise as part of establishing the transaction communication between the first enterprise and the second enterprise;
     when a third enterprise is authorized to access the enterprise priority information of the first enterprise, sending the enterprise priority information of the first enterprise to the third enterprise as part of establishing a transaction communication with the third enterprise; and
     forwarding the communication to the third enterprise when the third enterprise is authorized to access enterprise priority information of the second enterprise.

8. The system of claim 7, wherein the enterprise priority information is related to the communication.

9. The system of claim 7, wherein the enterprise priority information comprises at least one of customer priority information and a transaction history.

10. The system of claim 7, wherein the enterprise priority information is based on an identity of the second enterprise.

11. The system of claim 7, wherein the system is a communication server associated with the first enterprise.

12. The system of claim 7, the computer-readable medium storing further instructions which, when executed by the processor, result in operations further comprising determining whether the third enterprise is authorized to access the enterprise priority information of the first enterprise.

13. A non-transitory computer-readable medium having stored therein instructions which, when executed by a processor, cause the processor to perform operations comprising:
   receiving a request from a user to establish a communication between a first enterprise and a second enterprise;
   determining whether the second enterprise is authorized to access enterprise priority information of the first enterprise, wherein the enterprise priority information is based on an identity of the user;
   when the second enterprise is authorized to access the enterprise priority information of the first enterprise, sending the enterprise priority information of the first enterprise to the second enterprise as part of establishing the communication between the first enterprise and the second enterprise;

when a third enterprise is authorized to access the enterprise priority information of the first enterprise, sending the enterprise priority information of the first enterprise to the third enterprise as part of establishing a transaction communication with the third enterprise; and forwarding the communication to the third enterprise when the third enterprise is authorized to access enterprise priority information of the second enterprise.

14. The non-transitory computer-readable medium of claim 13, wherein the enterprise priority information comprises at least one of customer priority information and a transaction history.

\* \* \* \* \*